(12) United States Patent
Behr

(10) Patent No.: US 12,551,842 B2
(45) Date of Patent: Feb. 17, 2026

(54) METHOD AND ABSORBENT FOR ABSORBING CARBON DIOXIDE FROM AIR

(71) Applicant: Greenlyte Carbon Technologies GmbH, Essen (DE)

(72) Inventor: Peter Behr, Essen (DE)

(73) Assignee: Greenlyte Carbon Technologies GmbH, Essen (DE)

( * ) Notice: Subject to any disclaimer, the term of this patent is extended or adjusted under 35 U.S.C. 154(b) by 186 days.

(21) Appl. No.: 18/279,366

(22) PCT Filed: Mar. 3, 2022

(86) PCT No.: PCT/EP2022/055430
§ 371 (c)(1),
(2) Date: Aug. 29, 2023

(87) PCT Pub. No.: WO2022/184840
PCT Pub. Date: Sep. 9, 2022

(65) Prior Publication Data
US 2024/0198280 A1    Jun. 20, 2024

(30) Foreign Application Priority Data
Mar. 3, 2021   (DE) .......................... 102021105154.1

(51) Int. Cl.
*B01D 53/14*   (2006.01)
(52) U.S. Cl.
CPC ..... *B01D 53/1475* (2013.01); *B01D 53/1493* (2013.01); *B01D 2252/103* (2013.01); *B01D 2257/504* (2013.01)

(58) Field of Classification Search
CPC ............ B01D 53/1475; B01D 53/1493; B01D 2252/103; B01D 2257/504
USPC ......................................................... 423/220
See application file for complete search history.

(56) References Cited

U.S. PATENT DOCUMENTS

| 4,197,421 | A | 4/1980 | Steinberg |
| 6,436,174 | B1 | 8/2002 | Grossmann et al. |
| 8,703,082 | B2 | 4/2014 | Svendsen et al. |
| 10,610,826 | B2 † | 4/2020 | Singh |
| 2010/0205856 | A1 | 8/2010 | Kubic et al. |
| 2013/0139695 | A1 † | 6/2013 | Chang |
| 2013/0281553 | A1 | 10/2013 | Kubic et al. |
| 2021/0180196 | A1 * | 6/2021 | Schmid .................... C25B 3/26 |

(Continued)

FOREIGN PATENT DOCUMENTS

| CN | 105646865 A | 6/2016 |
| DE | 19828977 A1 | 12/1999 |

(Continued)

*Primary Examiner* — Anita Nassiri-Motlagh
(74) *Attorney, Agent, or Firm* — Slater Matsil, LLP

(57) ABSTRACT

In an embodiment a method includes loading an absorbent with a carbon dioxide in a first device, wherein a hydrogen carbonate-containing solution is formed, feeding the hydrogen carbonate-containing solution from the first device into an electrolysis unit, electrolyzing the hydrogen carbonate-containing solution in the electrolysis unit to release carbon dioxide, wherein a carbonate-rich solution is formed in the electrolysis unit, forming oxygen, hydrogen and carbon dioxide in the electrolysis unit, and recycling the carbonate-rich solution from the electrolysis unit to the first device.

14 Claims, 8 Drawing Sheets

(56) References Cited

U.S. PATENT DOCUMENTS

| | | |
|---|---|---|
| 2022/0097004 A1 | 3/2022 | Makaruk et al. |
| 2025/0050273 A1 | 2/2025 | Lackner |

FOREIGN PATENT DOCUMENTS

| | | | |
|---|---|---|---|
| EP | 3384973 A1 | 10/2018 | |
| JP | 2008100211 A | 5/2008 | |
| WO | 2008072979 A1 | 6/2008 | |
| WO | 2017158493 A1 | 9/2017 | |
| WO | WO-2019120812 A1 * | 6/2019 | ............ C25B 13/02 |
| WO | 2020152330 A1 | 7/2020 | |
| WO | 2020163513 A1 † | 8/2020 | |
| WO | WO-2020223804 A1 * | 11/2020 | ........... C25B 15/087 |

\* cited by examiner
† cited by third party

METHOD AND ABSORBENT FOR ABSORBING CARBON DIOXIDE FROM AIR

CROSS-REFERENCE TO RELATED APPLICATIONS

This patent application is a national phase filing under section 371 of PCT/EP2022/055430, filed Mar. 3, 2022, which claims the priority of German patent application 102021105154.1, filed Mar. 3, 2021, each of which is incorporated herein by reference in its entirety.

TECHNICAL FIELD

The present invention relates to a method for absorbing carbon dioxide from an air stream. Further, the present invention comprises a carbon dioxide absorbent for absorbing carbon dioxide from an air stream.

BACKGROUND

One of the greatest challenges of the 21st century will be to return the gas composition of the atmosphere to ranges that prevent excessive climatic warming of the earth. It has been scientifically proven that the warming in recent decades in particular is due to an increase in the so-called greenhouse gases. Among the greenhouse gases, carbon dioxide in particular occupies a key position, whereby the sharp rise of the carbon dioxide concentration is due to increased combustion of fossil fuels. In this respect, it will be important for the near future, in addition to reducing new carbon dioxide emissions, to simultaneously provide technical solutions for absorbing and storing carbon dioxide from the environment. Only by largely avoiding new greenhouse gases and efficiently dealing with existing greenhouse gases can unintended global warming be kept within reasonably tolerable limits.

One technical option for removing carbon dioxide from the air is that the carbon dioxide is passed over or through an adsorbent and is selectively removed by it from the air stream. The carbon dioxide concentration in the air is thereby reduced, whereas the carbon dioxide concentration in the absorbent increases during the method. This procedure is known for a variety of different absorbents, whereby the systems are sufficiently complex as both the concentration of carbon dioxide and the ambient conditions during absorption can be variable such that different efficiencies in absorption are achieved with different absorbents. Furthermore, environmental aspects naturally play a major role as efficient compositions are not always particularly environmentally friendly. A further aspect arises from the fact that the absorbing medium must be inexpensive and not be a hindrance in the course of further processing of the absorbed carbon dioxide.

From these considerations, a variety of carbon dioxide absorbents suitable for absorbing carbon dioxide have found their way into the patent literature.

For example, Patent Application No. WO 2008 072 979 A1 discloses a method for capturing $CO_2$ from exhaust gas in an absorber, wherein the $CO_2$-containing gas is passed through an aqueous absorbent slurry, characterized in that the aqueous absorbent slurry includes an inorganic alkaline carbonate, bicarbonate and at least one of an absorption accelerator and a catalyst, and the $CO_2$ is converted to solids by precipitation in the absorber, wherein the slurry with the precipitated solids is conveyed to a separator in which the solids are separated, and substantially all of the at least one of absorption accelerator and catalyst is returned to the absorber along with the remaining aqueous phase.

In a further Patent Application No. WO 2020 152 330 A1, a method for separating and gaining carbon dioxide from ambient air is disclosed. The method comprises continuously performing the following steps: a) contacting ambient air with an aqueous solution of at least one alkali or alkaline earth metal cation to absorb the carbon dioxide into the solution to form the hydrogen carbonate or carbonate of said at least one metal; b) electrodialysis of the resulting solution using a combination of bipolar ion exchange membranes and ion exchange membranes selective for monovalent or multivalent anions to obtain a solution enriched in (hydrogen) carbonate ions and a solution depleted in said carbonate ions, wherein the solution depleted in (hydrogen)carbonate ions is recycled to step a); c) thermal desorption of carbon dioxide from the (hydrogen)carbonate ion enriched solution obtained in step b) by means of steam stripping to obtain a carbon dioxide-water vapor mixture and a $CO_2$ depleted solution recycled to step b), wherein a pH is therein adjusted to between 7 and 8.5 or between 8 and 9.5; and d) separating water from the obtained carbon dioxide-water vapor mixture by means of cooling to condense the water vapor and optionally further drying the carbon dioxide.

In Patent Application No. EP 3 384 973 A1, a method for recovering carbon dioxide for enrichment of gas streams used to produce sodium carbonate and sodium hydrogen carbonate by the ammonia-soda process is described. The method comprises: contacting the streams of process gases and/or outlet gases occurring in the process for the production of sodium carbonate and sodium hydrogen carbonate according to the ammonia-soda process in the $CO_2$ absorption column, comprising: —a part or all of a gas stream originating from lime combustion in shaft lime kilns with air blast, and/or—a part or all of an outlet gas stream from the plant for carbonation of soda ash and/or part or all of an outlet gas stream from a baking powder carbonization plant, and, if applicable, one or more streams of flue gases or other carbon dioxide-containing gases resulting from the combustion of solid, liquid, or gaseous fuels to produce heat or electrical energy to meet production requirements through the ammonia-soda process;

and optionally one or more flue gas streams or other carbon dioxide-containing gases originating from an external supplier with an aqueous absorbent solution stream to form a carbon dioxide-enriched aqueous absorbent solution, heating a carbon dioxide-enriched aqueous absorbent solution in the evaporator, desorbing gaseous carbon dioxide while regenerating an aqueous absorbing solution in a desorption column, cooling the regenerated aqueous absorbing solution and returning it to the $CO_2$ absorption column, and removing it from the desorption column, and cooling the stream with a high carbon dioxide content for use in the process for producing sodium carbonate and sodium hydrogen carbonate by the ammonia-soda process.

Such solutions, known from the prior art, may offer further potential for improvement, in particular with regard to the efficiency of carbon dioxide uptake under variable ambient conditions and, in particular, with regard to the possibility of ensuring effective removal even under low carbon dioxide partial pressures.

SUMMARY

Embodiments overcome the disadvantages known from the prior art. Further embodiments provide a method which is capable of efficiently binding carbon dioxide from the air under varying and, in particular, under low partial pressures. Yet other embodiments provide a carbon dioxide absorbent which is characterized by a particularly efficient and uniform carbon dioxide uptake and which is in particular flexibly adaptable, so that even under unfavorable ambient conditions, and here in particular under very low carbon dioxide concentrations, a fast and almost complete selective carbon dioxide uptake is set. Furthermore, the method and absorbent are in particular suitable for use in electrolysis for the release and further utilization of the absorbed carbon dioxide.

Accordingly, according to the invention is a method for absorbing carbon dioxide from an air stream, wherein the air stream is contacted with a carbon dioxide absorbent and the carbon dioxide absorbent comprises at least:
   a) water in a proportion of greater than or equal to 2 wt % and less than or equal to 93 wt %;
   b) polyethylene glycols or polyols with a molecular weight of less than or equal to 1000 g/mol in a proportion of greater than or equal to 2 wt % and less than or equal to 93 wt %; and
   c) carbon dioxide absorbing agent in a proportion of greater than or equal to 5 wt % and less than or equal to 60 wt %, wherein the carbon dioxide absorbing agent is selected from the group of inorganic carbonates, amines, polyethylene glycol amines, diaminopolyethylene glycols, carboxylic acid derivatives of polyethylene glycol amines, polyethylene imines, amine-containing sugar derivatives, amino acids or mixtures of at least two of these components.

Surprisingly, it was found that the above method with the described composition is particularly suitable for capturing carbon dioxide from gas streams. The gas streams can be exhaust gas streams enriched with carbon dioxide or natural ambient air. The carbon dioxide absorbent is thus capable of processing air streams with widely varying carbon dioxide concentrations and can be adjusted to the specific carbon dioxide concentrations present, for example, by varying the concentrations in the composition ranges indicated above. The kinetics of uptake are particularly rapid and removal can be achieved down to very low levels of carbon dioxide even at very low carbon dioxide concentrations. The formulation constituents used are chemically stable, non-toxic and inexpensive, so that even very large quantities of absorbent can be provided. In particular, the present composition solves the disadvantages of conventional carbon dioxide absorbents, whereby the $CO_2$ absorption of prior art baths is basically characterized by two problems. On one hand, in contrast to industrial exhaust gas streams, ambient air shows only a rather low $CO_2$ partial pressure of about 440 ppm and, on the other hand, a dynamic equilibrium is established between the carbon dioxide absorbent and the exhaust gas stream with respect to water. Via the uptake/release of water to or from the exhaust gas stream, it can lead to varying water concentrations in the absorbent, which affects the efficiency of the uptake. For example, if carbon dioxide is absorbed from dry ambient air, the carbon dioxide absorbent will be depleted of water. If the ambient air is too humid, the carbon dioxide absorbent will be "watered down" by uptake water from the air. Thus, depending on the concentration of water in the absorbent and the relative humidity, net absorption or desorption takes place, which greatly affects the functioning of the absorbent. Although maintaining an optimal water concentration in the absorbent medium can be accomplished by adding deionized water, such addition is energy and cost intensive. According to the invention, the water vapor partial pressure of the absorption medium is adjusted via the composition by means of component b) in such a way that the entire carbon dioxide absorbent is more robust to the changes in the surrounding relative humidity, or that the absorbent can be specifically adjusted to these ambient conditions from the outset. However, the addition is not done for the pure purpose of adjusting to the ambient conditions. By the selection of component b) it is also ensured, at least synergistically, that rapid and efficient absorption of the carbon dioxide occurs. Without being bound by the theory, this most likely results from the fact that component b) not only changes the vapor pressure of the entire solution, and here in particular the vapor pressure of the water, but that there is also an interaction of component b) with the actual absorbent for the carbon dioxide. In addition, the changed viscosity of the solution can also influence the absorption equilibrium, wherein highly viscous solutions in particular show inadequate application properties. Thus, component b) also interacts with component c) and thus the ability to absorb carbon dioxide, which is reflected in particular in the kinetics and the total possible absorption capacity of the carbon dioxide absorbent. In this respect, it was surprisingly found that the efficiency of the absorbent to take up carbon dioxide can be increased by the presence of component b). The latter, for example, in interaction with inorganic carbonates, whose solubility in water is reduced by component b). Component b) thus actively intervenes in the absorption equilibrium. These advantages are achieved without adversely affecting the carbon dioxide uptake kinetics. In addition to humidity, the binary liquid mixture can also be adjusted particularly precisely to a wide temperature range from −30° C. to 50° C. Absorption solutions adaptable to the ambient conditions are thus obtained, which provide particularly stable and efficient absorption solutions, in particular in the marginal areas of carbon dioxide uptake, for example in unfavorable ambient conditions or with very low carbon dioxide loadings. A further advantage of the method is that the carbon dioxide once it has been absorbed into the liquid can be expelled relatively easily and with high electrical efficiency via electrolysis. In sum, a very efficient cycle for absorption and delivery can be established, in particular through the simple separation, which can provide pure carbon dioxide without significant admixtures of other gases, for example for synthesis purposes.

The method according to the invention is suitable for the absorption of carbon dioxide from an air stream. Air flow in the sense of the invention can be understood as the directed movement of a gas or gas mixture which moves over or into the carbon dioxide absorbent. The moving air may be either ambient air, i.e., "natural" air that has not been further processed, or exhaust air from an industrial process, for example, the exhaust gases from a combustion process. In addition to possible impurities, the latter also have a significantly higher carbon dioxide content. Within the method, the carbon dioxide absorbent is thus contacted with the air stream and selectively extracts the carbon dioxide from the air stream. The air exiting the absorbent or the air present in the air stream after contact has a lower amount of carbon dioxide. The amount of carbon dioxide in the carbon dioxide absorbent, on the other hand, increases accordingly.

As first component a), the method uses water in a proportion of greater than or equal to 2 wt % and less than or equal to 93 wt %. The water proportion in the carbon dioxide absorbent can be measured by methods known to the skilled person. Depending on the water content, Karl Fischer methods or other physical water determination methods are suitable, for example. Preferably, the weight proportion of component a) can be greater than or equal to 5 wt % and less than or equal to 65 wt %, and further preferably greater than or equal to 7 wt % and less than or equal to 60 wt %.

As second component b), the carbon dioxide absorbent comprises polyethylene glycols or polyols with a molecular weight of less than or equal to 1000 g/mol in a proportion of greater than or equal to 2 wt % and less than or equal to 93 wt %. In contact with ambient air, polyethylene glycol (PEG) or polyols that comprise a specifically defined vapor pressure and do not have any effect that is hazardous to the environment or health are suitable for this purpose. Polyethylene glycols of the general empirical formula $C_{2n}H_{4n+2}O_{n+1}$ have proved to be particularly suitable:

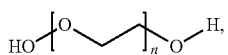

where n is selected from 1 to 10, for example. The partial pressure of the substances at 298 K thereby decreases from 5 Pa for n=1 to $5.47*10^{-8}$ Pa for n=8. PEGs from n>4 are considered non-volatile. The polyethylene glycols also comprise exceptionally low toxicity values and are completely biodegradable up to n<20. To adjust the water vapor partial pressure, the organic compounds are miscible with water in any quantitative ratio. Polyols in the sense of the invention are aliphatic substances which carry at least two —OH groups. Preferably, the polyols carry at least 3, more preferably 4 OH groups. A preferred representative from this group is, for example, glycerol. Further preferably, the second component b) can be present in a weight proportion of greater than or equal to 30 wt % and less than or equal to 90 wt %, further preferably of greater than or equal to 35 wt % and less than or equal to 85 wt % in the carbon dioxide absorbent.

As third component c), the carbon dioxide absorbent comprises carbon dioxide absorbing agents in a proportion of greater than or equal to 5 wt % and less than or equal to 60 wt %, wherein the carbon dioxide absorbing agent is selected from the group of inorganic carbonates, amines, polyethylene glycol amines, diaminopolyethylene glycols, carboxylic acid derivatives of polyethylene glycol amines, polyethylene imines, amine-containing sugar derivatives, amino acids or mixtures of at least two of these components. An important component is component b), whose interaction with carbon dioxide contributes to the actual physical binding of carbon dioxide in the carbon dioxide absorbent. Consequently, these substances are capable of strong physical interaction with the $CO_2$, which is the basis of high uptake capacity and fast kinetics at low $CO_2$ partial pressures. In principle, all $CO_2$ absorbents are suitable for this purpose, provided that they exhibit sufficient solubility in the mixture of components a) and b) according to the invention. In contact of the dissolved substance of component c) with the ambient air, the above group selection advantageously shows an almost negligible vapor pressure and no potential hazardous to health or the environment. In further preferred embodiments, the third component c) may be present in a proportion of greater than or equal to 10 wt % and less than or equal to 50 wt % and further preferably greater than or equal to 15 wt % and less than or equal to 45 wt %. In particular, the weight proportions of components a)+b)+c) may add up to 100 wt %. The proportions may change as a result of the inclusion of carbon dioxide.

As amines primary, secondary or tertiary amines from the above molecular weight range are suitable.

Polyethylene glycol amines, diaminopolyethylene glycols and carboxylic acid derivatives of polyethylene glycol amines may be substances in which one (polyethylene glycol amine) or both OH groups (diaminopolyethylene glycol) of the PEG have been replaced by amine groups. The carboxylic acid derivatives have a corresponding structure in which one or both OH groups have been replaced by carboxylic acid groups (—COOH).

As sugar derivatives N-methyl-D-glucamine (meglumine) and N-ethyl-D-glucamine (eglumine) are suitable, for example. Both show very good solubility and negligible vapor pressure in solution.

As component c) polyethyleneimines according to the following formula are also suitable:

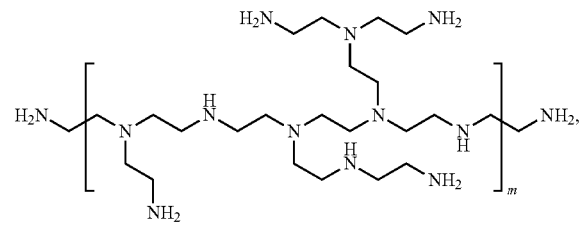

wherein the properties with respect to viscosity, vapor pressure and carbon dioxide absorption can be finely adjusted via the number m. Preferably, the molecular weight of the branched polyethyleneimines can be less than or equal to 800 g/mol.

In a preferred embodiment of the method, the air stream may comprise a carbon dioxide concentration of greater than or equal to 100 ppm and less than or equal to 650 ppm. The method according to the invention may, in particular, be suitable for further removing carbon dioxide from air streams with very low carbon dioxide concentrations. In prior art baths, these conditions usually lead to uncontrollable uptake or release of water from the solution, which requires close process monitoring with corresponding control efforts. The method presented here allows reliable and continuous uptake of carbon dioxide from these low carbon dioxide streams, and thus the method is not limited to the treatment of exhaust gases. Methods can also be established which can efficiently perform an uptake of carbon dioxide from ambient air.

Within a further preferred embodiment of the method, carbon dioxide can be continuously separated from a gas stream, wherein after at least partial saturation of the carbon dioxide absorbing agent, the absorbed carbon dioxide is removed from the carbon dioxide absorbent solution and the remaining components of the carbon dioxide absorbing agents, optionally after supplementation of the carbon dioxide absorbing agent, are reused to separate carbon dioxide from a gas stream. Due to the chemical stability of the proposed components and the ease with which they can be separated, the carbon dioxide absorbent of the invention may be particularly suitable for methods in which the absorbent is returned back into the method more frequently. This can improve the overall process balance and contribute to an economical operation.

Within a further preferred embodiment of the method, the carbon dioxide absorbing agent may be selected from the group consisting of potassium carbonate, sodium carbonate, amino acids or mixtures of these components with a weight proportion of greater than or equal to 10 wt % and less than or equal to 50 wt % based on the total weight of the carbon dioxide absorbent. In a water-based carbon dioxide absorbent, potassium carbonate or sodium carbonate react according to the reaction equation established below for sodium carbonate:

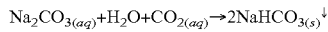

$$Na_2CO_{3(aq)} + H_2O + CO_{2(aq)} \rightarrow 2NaHCO_{3(s)}\downarrow$$

In this case, component b) not only serves to adjust the water vapor partial pressure accordingly to the ambient conditions, but this component b) also has a decisive influence on the solubility of the hydrogen carbonate, so that at atmospheric $CO_2$ concentrations below or around 400 ppm, a steady $CO_2$ uptake and precipitation as hydrogen carbonate or a hydrogen carbonate-containing compound takes place. In this respect, there is a synergistic effect of control and stabilization of the absorbent composition and influence on the absorption of the carbon dioxide as such. Suitable combinations are, for example, $Na_2CO_3$ and MEG (monoethylene glycol)/$H_2O$ and PEG150/$H_2O$. Suitable combinations for $K_2CO_3$ are, for example, MEG/$H_2O$ and PEG150/$H_2O$. In these embodiments, particularly large synergistic effects result. For the $K_2CO_3$, the precipitate product obtained within the carbon dioxide absorbent of the invention is $KHCO_3$. In addition, the bath composition is also robust enough that the precipitation of sodium or potassium hydrogen carbonate can be enhanced by adding equionic additives, such as NaCl. This is, in particular, possible for carbonate/PEG/water solutions.

Particularly advantageously, this group of component c) can also be combined with further inorganic, organic or enzymatic promoters to accelerate the $CO_2$ absorption rate. For example, an acceleration of the $CO_2$ absorption rate in a potassium carbonate solution can be enhanced by the addition of the following substances: alkanolamines, aliphatic amines, heterocyclic amines, piperazine derivatives, amino acid salts, carbonic anhydrase. In particular, it was also shown that subsequent substances can also influence the relative carbamate stability. This is a measure of the extent to which the carbamate formed intermediately by $CO_2$ absorption decomposes again in solution to the amine and hydrogen carbonate and thus exhibits further catalytic activity. The following substances have proven to be particularly suitable for $CO_2$ absorption from air due to their ionic character in solution with a correspondingly low vapor pressure: aminoisobutyric acid, aminohexanoic acid, piperazine, pipecolic acid, L-proline, 2-amino-2-methylpropanol. Particularly suitable pipecolic acid can be used together with water/PEG/inorganic carbonate compositions as carbon dioxide absorbent.

Within a further preferred aspect of the method, component b) may comprise polyethylene glycols with a molecular weight of greater than or equal to 200 g/mol and less than or equal to 400 g/mol in a proportion of greater than or equal to 45 wt % and less than or equal to 80 wt %. In particular, this composition of polyethylene glycols in the indicated weight proportion range can help the absorbent to exhibit a sufficiently low vapor pressure at a relatively low viscosity. This allows the absorbent to be operated in a variety of different reactors without the need for further adjustments to the reactor geometry. Furthermore, the specified polyethylene glycols in the specified weight proportions can help the actual carbon dioxide absorbent precipitate from solution particularly efficiently, allowing larger amounts of carbon dioxide to be removed more quickly from the air stream. In a further preferred embodiment, the proportion may comprise greater than or equal to 50 wt % and less than or equal to 75 wt %. This results in a particularly stable absorbent that can be operated highly efficiently over a wide range of different process conditions.

According to a preferred characteristic of the method, the molar ratio of water to the sum of components b) and c), expressed as n(water)/(n(water)+n(component b))+n(component c)), can be greater than or equal to 0.5 and less than or equal to 0.95. In particular, with this molar ratio between component a) and b)+c), suitable carbon dioxide absorbents can be obtained, which are characterized by a very stable composition in operation under a wide range of different ambient conditions. The viscosity of the mixtures is in a particularly suitable low range, so that a variety of different reactors can be used for absorption and further processing. Furthermore, it is advantageous that the absorption equilibrium can be strongly controlled in the direction of precipitating products via the composition, so that very fast reaction kinetics are obtained, in particular for inorganic absorbents in group c).

In a further preferred embodiment of the method, the carbon dioxide absorbent may comprise a further carbon dioxide absorbing agent selected from the group consisting of polyethylene glycolamines with a molecular weight greater than or equal to 190 g/mol and less than or equal to 370 g/mol, or mixtures of at least two of these components in a weight proportion of greater than or equal to 10 wt % and less than or equal to 60 wt %. In addition to the constituents of component c), further polyethylene glycolamine may be present in the carbon dioxide absorbent, wherein this weight proportion must be added to the proportion of component c)). This combination, especially with inorganic constituents of component c), i.e., for example, alkali metal carbonates or alkaline earth metal carbonates, can contribute to particularly efficient baths, which also contribute to stable absorption processes under unfavorable ambient conditions and high or fluctuating temperatures. It was also shown that the substance class of polyethylene glycol amines in aqueous PEG solutions act as adsorption promoters for $K_2CO_3$ and comprise a substantially increased catalytic activity for the formation and precipitation of $KHCO_3$. This may be highly likely due to the fact that, first, PEG improves the physical solubility of $CO_2$ in solution; second, PEG reduces the stability of the carbamate formed by the reaction of $CO_2$ with the amine and thus promotes hydrolysis to the hydrogen carbonate with reformation of the amine to react again with the physically dissolved $CO_2$; and third, PEG reduces the solubility of the hydrogen carbonate formed and thus promotes precipitation as potassium hydrogen carbonate. This results in a highly efficient system that can be flexibly adapted to different ambient conditions and carbon dioxide concentrations and has a long service life.

In a further preferred embodiment of the method, the carbon dioxide absorption solution may comprise water in a weight proportion of greater than or equal to 20 wt % and less than or equal to 30 wt %, as component b) a PEG 200 or PEG 300 in a weight proportion of greater than or equal to 60% and less than or equal to 70%, and as component c) potassium carbonate in a weight proportion of greater than or equal to 10 wt % and less than or equal to 20 wt %. Under moderate environmental conditions, such a composition can preferably be used flexibly and under long service lives. In particular, such carbon dioxide absorbent composition can be operated at humidities from 50% rh to 85% rh, further preferably at humidities from 60% rh to 80% rh, further preferably 70% rh to 80% rh. Preferably, the ambient or bath temperature may be between greater than or equal to 15° C.

and less than or equal to 40° C., further greater than or equal to 20° C. and less than or equal to 30° C.

In a further embodiment of the method, after contact with the air stream, the carbon dioxide absorbent can be subjected to electrolysis in a further method step d), wherein the electrolysis is at least a three-chamber electrolysis with anode chamber, cathode chamber and middle bridge chamber with a bipolar membrane adjacent to the anode chamber, wherein the carbon dioxide-loaded absorbent is fed at least into the middle bridge chamber. Regardless of the loading of the air stream with $CO_2$, absorbents loaded with $CO_2$ can be recycled particularly advantageously with a three-chamber electrolysis. This can be described particularly advantageously in the case of an absorbent of a carbonate solution and, if necessary, additional absorption-accelerating promoters. The $CO_2$ bound intermediately as hydrogen carbonate can be released as a parallel reaction during the electrolytic generation of hydrogen and oxygen. The carbonate solution formed thereby can be used again for $CO_2$ absorption from the air. The aim of separating $CO_2$ from the air is to use it as a synthesis component, for example, in the production of hydrocarbons. In addition to the separation of $CO_2$, the production of hydrogen is necessary and desirable for this purpose. In the context of decarbonization, this will be generated essentially electrolytically in the future.

Prior art in the electrolytic treatment of solutions containing carbon dioxide is the electrolysis of aqueous KOH solutions. Efficiencies of 70% to 80% are achieved here. The efficiency losses result mainly from the overvoltage at the anode. If the aqueous electrolyte consisting of a KOH leach is replaced by an aqueous $KHCO_3^-$ mixture, which is formed during $CO_2$ absorption from the air, and if the anodes and cathode chambers are separated by a cation-selective membrane, $CO_2$ is also released at the anode in addition to $O_2$. If the separated $CO_2$ is to be used as a synthesis building block in a downstream process, this method is only suitable to a limited extent, since the oxygen has to be removed from the carbon dioxide-oxygen gas mixture very costly in terms of method technology and under energy consumption. This problem can be circumvented by carrying out the electrolysis in a 3-chamber setup. In this method step, the different gases, oxygen, carbon dioxide and hydrogen, can be collected in separate chambers and in this respect it is not necessary to separate the components.

The conversion of a hydrogen carbonate solution has significant advantages over the electrolysis of carbonate solutions. The stoichiometry of the conversion of $CO_2$ during the electrolysis of a carbonate solution is known. The following relationship applies to carbonate solutions:

$$K_2CO_3 + 2H_2O \rightarrow CO_2\uparrow + H_2\uparrow + \tfrac{1}{2}O_2\uparrow + 2KOH$$

Two electrons are required for the release of a $CO_2$ molecule on a carbonate basis. The release of $CO_2$ from a hydrogen carbonate solution can be used as a parallel reaction in electrolytic $H_2$ and $O_2$ generation and can be expressed via the following equation:

$$4KHCO_3 \rightarrow 2CO_2\uparrow + H_2\uparrow + \tfrac{1}{2}O\uparrow + 2K_2CO_3 + H_2O$$

It is of advantage during the use of a hydrogen carbonate solution that only one electron is required for the release of a $CO_2$ molecule. The simultaneous release of $CO_2$ from a hydrogen carbonate solution during electrolytic hydrogen and oxygen production is thus extremely energy-efficient. Thermodynamically, the potential difference to be overcome results from the water decomposition at 1.23 V and the overvoltages at the anode and cathode at about 0.5 V combined. The potential difference to be overcome for the release of the $CO_2$ also depends on the concentration ratios in the intermediate chamber and the cathode chamber. These produce a potential difference of about 0.2 V at the cation-selective membrane. In addition to the electrochemically favorable stoichiometry, a three-chamber electrolyzer induces the formation of $O_2$ at the anode, the formation of $H_2$ at the cathode, and simultaneously the formation of $CO_2$ in the intermediate chamber. Stoichiometrically, ½ $O_2$, $H_2$ and 2 $CO_2$ result as nearly pure gaseous components in separate volumes of the three chambers. Thus, a complex separation of the individual gas components can be omitted.

Preferably, the three-chamber method can be carried out using a hydrogen carbonate solution or an amino acid solution, wherein the individual solutions have been loaded with carbon dioxide via the method according to the invention. However, it is also possible for other solutions according to the invention to be used as long as they also form hydrogen carbonates or amino acid-carbon dioxide complexes with carbon dioxide. These solutions can also be converted in a three-chamber electrolyzer.

In a preferred embodiment of the method, the carbon dioxide absorbent may be subjected to electrolysis after contact with the air stream, wherein the electrolysis is a two-chamber electrolysis, wherein the carbon dioxide-loaded absorbent is fed into the anode chamber. The method according to the invention is particularly suitable for providing solutions loaded with carbon dioxide, which can also be electrolyzed as part of a two-chamber method. In this case, hydrogen and a mixture of carbon dioxide and oxygen are produced separately. This variant may be suitable in cases where a mixture of oxygen and carbon dioxide is to be further processed. Alternatively, the gas mixture can also be separated into its individual components at a later stage.

In a further preferred embodiment of the method, the anode can be a $Ni(OH)_2$ anode. In particular, the combination of a two-chamber electrolysis with a special nickel electrode offers special advantages in the electrolytic conversion of solutions loaded according to the invention. In this method variant, a porous nickel anode is used whose surface has been coated and functionalized with $Ni(OH)_2$. This anode makes it possible to substantially lower the required overvoltage during electrolysis of a solution loaded according to the invention, as well as to make the release of $H_2$ and $O_2$ sequential by binding $O_2$ to the electrode. By using this electrode or another electrode capable of binding oxygen to the surface, the separation of the individual gas components in the context of a two-chamber electrolysis becomes possible very economically. If one advantageously uses a solution according to the invention, such as a $KHCO_3$ solution according to the invention, and separates the anode and cathode chambers by means of a cation-selective membrane, this embodiment allows $CO_2$ to be released at the anode and pure hydrogen to be produced at the cathode at the same time. The $CO_2$ released and $H_2$ generated in a stoichiometric ratio of 2:1 can be used directly, for example, to synthesize hydrocarbons. The overall reaction for this embodiment is:

$$4KHCO_3 \rightarrow 2Ni(OH)_2 \rightarrow 2CO_2\uparrow + H2\uparrow + 2NiOOH + 2K_2CO_3 + H_2O.$$

The oxygen bound to the surface of the electrode can, for example, be desorbed in a downstream process at a higher temperature:

$$2NiOOH + H_2O \rightarrow 2Ni(OH)_2 + \tfrac{1}{2}O_2\uparrow$$

This method variant is extremely energy-efficient, as the excess voltage at the anode is significantly reduced and electrolysis can be operated at a voltage of 1.5 V close to the thermodynamically required minimum of 1.23 V. At the same time, $CO_2$ previously absorbed from the air is released from the electrolyte in pure form. If, on the other hand, $CO_2$ is recovered in a separate method step, as is currently technically common, this involves an enormously high energy input. This method variant can be coupled particularly well with the method according to the invention, since the absorbents according to the invention are very well suited for the absorption of carbon dioxide and for electrolysis.

Furthermore, the use of the method according to the invention for separating carbon dioxide from an air stream and using the carbon dioxide as a synthesis building block for a hydrocarbon is in accordance with the invention. The method can serve in a particularly favorable manner as a basis for a further method step in which the separated carbon dioxide is used as a starting material for the production of a hydrocarbon. The selection of the individual components of the carbon dioxide absorbent ensures that a very efficient conversion of the carbon dioxide into further valuable substances can take place both from the solution or after separate separation. For example, the carbon dioxide can be catalytically hydrogenated to methane with hydrogen addition, without the substances used being known in traces as catalyst poisons. Important valuable substances can be obtained by this step, which can substitute hydrocarbons from fossil sources. A climate-neutral cycle can be established, which in particular can contribute to a reduction in the increase of greenhouse gases in the atmosphere.

Further according to the invention is a carbon dioxide absorbent for absorbing carbon dioxide from an air stream, the absorbent comprising at least:
a) water in a proportion of greater than or equal to 2 wt % and less than or equal to 93 wt %;
b) polyethylene glycols or polyols with a molecular weight of less than or equal to 1000 g/mol in a proportion of greater than or equal to 2 wt % and less than or equal to 93 wt %; and
c) carbon dioxide absorbing agent in a proportion of greater than or equal to 5 wt % and less than or equal to 60 wt %, wherein the carbon dioxide absorbing agent is selected from the group of inorganic carbonates, amines, polyethylene glycol amines, diaminopolyethylene glycols, carboxylic acid derivatives of polyethylene glycol amines, polyethylene imines, amine-containing sugar derivatives, amino acids or mixtures of at least two of these components. Surprisingly, the above composition was found to be particularly suitable for absorbing carbon dioxide from gas streams. The gas streams may be carbon dioxide-enriched exhaust gas streams or natural ambient air. The carbon dioxide absorbent is thus capable of processing air streams with widely varying carbon dioxide concentrations and can be adjusted to the specific carbon dioxide concentrations present, for example, by varying the concentrations in the ranges of the composition indicated above. The kinetics of uptake are particularly rapid and removal can be achieved down to very low levels of carbon dioxide even at very low carbon dioxide concentrations. The formulation constituents used are chemically stable, non-toxic and inexpensive, so that even very large quantities of absorbent can be provided. In particular, the present composition solves the disadvantages of conventional carbon dioxide absorbents, wherein the $CO_2$ absorption of prior art baths is basically characterized by two problems. On one hand, in contrast to industrial exhaust gas streams, ambient air shows only a rather low $CO_2$ partial pressure of about 440 ppm and, on the other hand, a dynamic equilibrium is established between the carbon dioxide absorbent and the exhaust gas stream with respect to water. The uptake/release of water to or from the exhaust gas stream can lead to varying water concentrations in the absorbent, which influences the efficiency of the uptake.

According to a preferred characteristic of the carbon dioxide absorbent, the carbon dioxide absorbing agent may be selected from the group consisting of potassium carbonate, sodium carbonate, amino acids or mixtures of these components with a weight proportion of greater than or equal to 10 wt % and less than or equal to 50 wt % based on the total weight of the carbon dioxide absorbent, and the carbon dioxide absorbent comprises another carbon dioxide absorbing agent selected from the group consisting of polyethylene glycol amines with a molecular weight of greater than or equal to 190 g/mol and less than or equal to 370 g/mol or mixtures of at least two of these components in a weight proportion of greater than or equal to 10 wt % and less than or equal to 60 wt %. In addition to the constituent of component c), further polyethylene glycolamine may be present in the carbon dioxide absorbent, wherein this weight proportion must be added to the proportion of component c). This combination, especially with inorganic constituents of component c), i.e., for example, alkali metal or alkaline earth metal carbonates, can contribute to particularly efficient baths, which also contribute to stable absorption processes under unfavorable ambient conditions and high or fluctuating temperatures. It has also been shown that the substance class of polyethylene glycol amines in aqueous PEG solutions act as adsorption promoters for $K_2CO_3$ and comprise substantially increased catalytic activity for the formation and precipitation of $KHCO_3$. This may be highly likely due to the fact that, first, PEG improves the physical solubility of $CO_2$ in solution; second, PEG reduces the stability of the carbamate formed by the reaction of $CO_2$ with the amine and thus promotes hydrolysis to the hydrogen carbonate with reformation of the amine to react again with the physically dissolved $CO_2$; and third, PEG reduces the solubility of the hydrogen carbonate formed and thus promotes precipitation as potassium hydrogen carbonate. This results in a highly efficient system that can be flexibly adapted to different ambient conditions and carbon dioxide concentrations and comprises a long service life.

In a further preferred embodiment of the carbon dioxide absorbent, the carbon dioxide absorbent may comprise water in a weight proportion of greater than or equal to 20 wt % and less than or equal to 30 wt %, as component b) a PEG 200 or PEG 300 in a weight proportion of greater than or equal to 60% and less than or equal to 70%, and as component c) potassium carbonate in a weight proportion of greater than or equal to 10 wt % and less than or equal to 20 wt %. Such a composition can preferably be used flexibly under moderate ambient conditions and under long service lives. In particular, such carbon dioxide absorbent composition can be operated at humidities from 50% rh to 85% rh, further preferably at humidities from 60% rh to 80% rh, further preferably 70% rh to 80% rh. Preferably, the ambient or bath temperature may be between greater than or equal to 15° C. and less than or equal to 40° C., further greater than or equal to 20° C. and less than or equal to 30° C.

BRIEF DESCRIPTION OF THE DRAWINGS

Further advantages and advantageous embodiments of the subject-matter according to the invention are illustrated by the drawings and explained in the following description. It should be noted that the drawings are descriptive only and are not intended to limit the invention.

It shows the.

DETAILED DESCRIPTION OF ILLUSTRATIVE EMBODIMENTS

Figure 1:
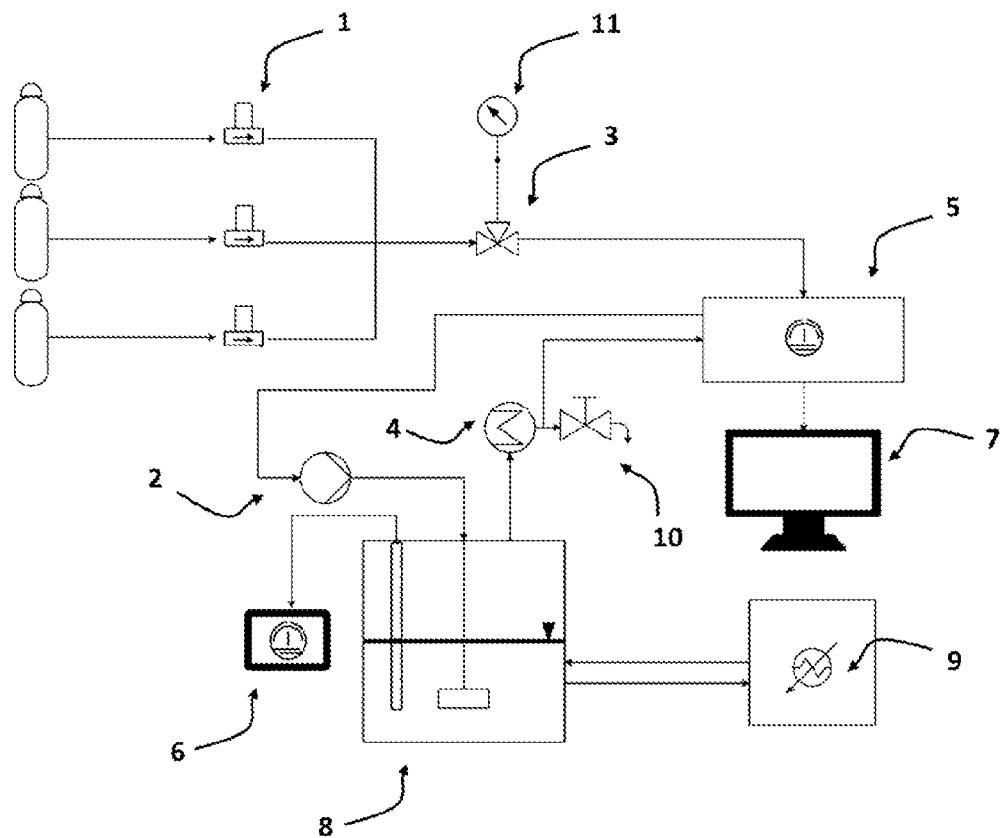
FIG. 1 a schematic setup of a test apparatus for determining carbon dioxide uptake in carbon dioxide absorbents according to the invention.

FIG. 1 shows an apparatus for detecting $CO_2$ absorption and determining the maximum loading capacity of the absorbent at a $CO_2$ concentration of 400 ppm. The setup allows a qualitative assessment of the possible $CO_2$ absorption rates. A $CO_2$-nitrogen mixture is brought under atmospheric conditions in contact with the absorbent solution 8 in a circular process via a frit. The time-varying $CO_2$ concentration is measured by a $CO_2$ analyzer 5 in the ppm range and recorded 7. A time-constant flow of 50 sccm per minute is maintained by pump 2 during the measurement. The tempering of the absorbing solution is carried out by a thermostat 9. The initial concentrations of 500 ppm and 0 ppm $CO_2$ are set by the flow controller 1. The rate of $CO_2$ absorption and setting of the equilibrium partial pressure is essentially given by the carbamate formation reactions when amines are added, for example:

$$CO_2 + RNH_2 \leftrightarrow RN^+H_2COO^- \tag{1}$$

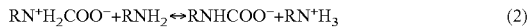
$$RN^+H_2COO^- + RNH_2 \leftrightarrow RNHCOO^- + RN^+H_3 \tag{2}$$

With carbonate addition, reaction 4 determines $CO_2$ absorption kinetics and equilibrium setting:

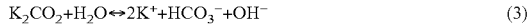
$$K_2CO_3 + H_2O \leftrightarrow 2K^+ + HCO_3^- + OH^- \tag{3}$$

$$CO_2 + OH^- \leftrightarrow HCO_3^- \tag{4}$$

If the amine is used as a catalyst to accelerate $CO_2$ uptake into a $PEG/H_2O/K_2CO_3$ solution, the equilibrium of carbamate hydrolysis (5) should be considered in addition to the system of equations (1-4):

$$RNHCOO^- + H_2O \leftrightarrow RNH_2 + HCO_3^- \tag{5}$$

The amine used in reaction 1 is recovered to form hydrogen carbonate.

Figure 2:
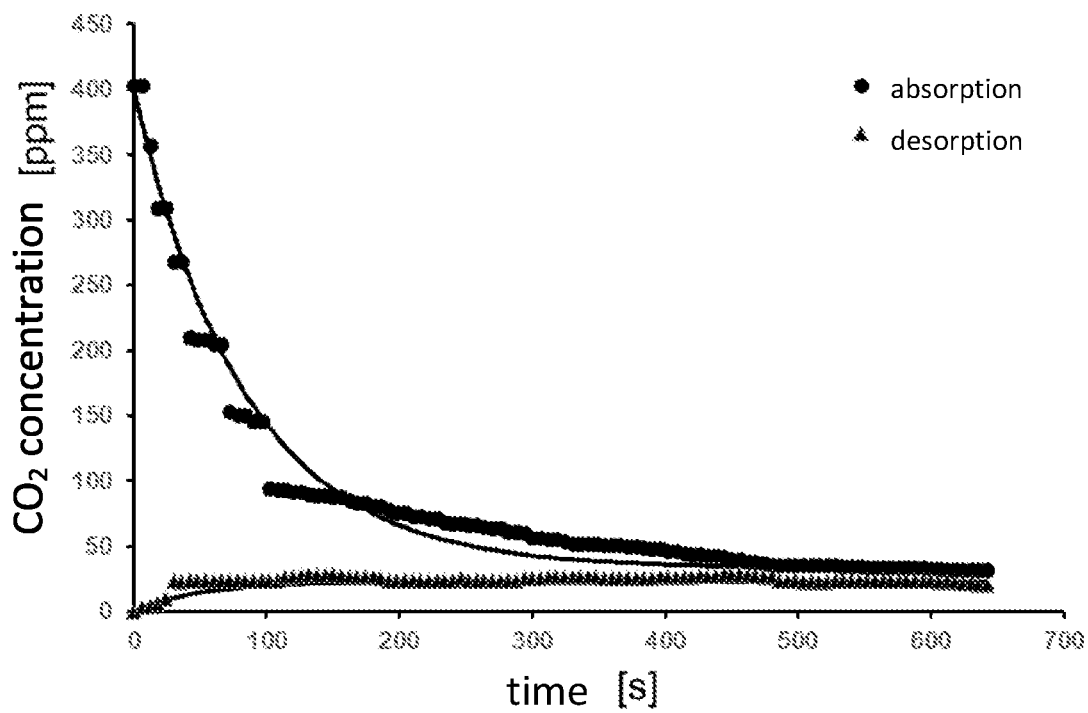
FIG. 2 the carbon dioxide absorption and desorption isotherms of a carbon dioxide absorbent according to the invention with TEG and DGA.

FIG. 2 shows the carbon dioxide absorption and desorption isotherms of a carbon dioxide absorbent according to the invention with TEG as component b) and DGA as component c). The composition of the carbon dioxide absorbent was 4.8 wt % DGA, 47.6 wt % TEG, and 47.6 wt % water. The pH was 11.9 and the measurement was performed at 20° C. and a relative humidity of 80%. Starting from a $CO_2$ concentration of 400 ppm in $N_2$, $CO_2$ absorption into a freshly prepared solution occurs up to a $CO_2$ concentration of 32 ppm within the observation time window of 642 s. Starting from a $CO_2$ concentration of 0 ppm in a $N_2$ atmosphere, a comparable $CO_2$ concentration equilibration between the liquid and gas phases occurs by $CO_2$ desorption. Comparable final $CO_2$ partial pressures, starting from 400 ppm or 0 ppm, show the adjustment of the $CO_2$ absorption/desorption equilibrium under the given experimental conditions.

Figure 3:
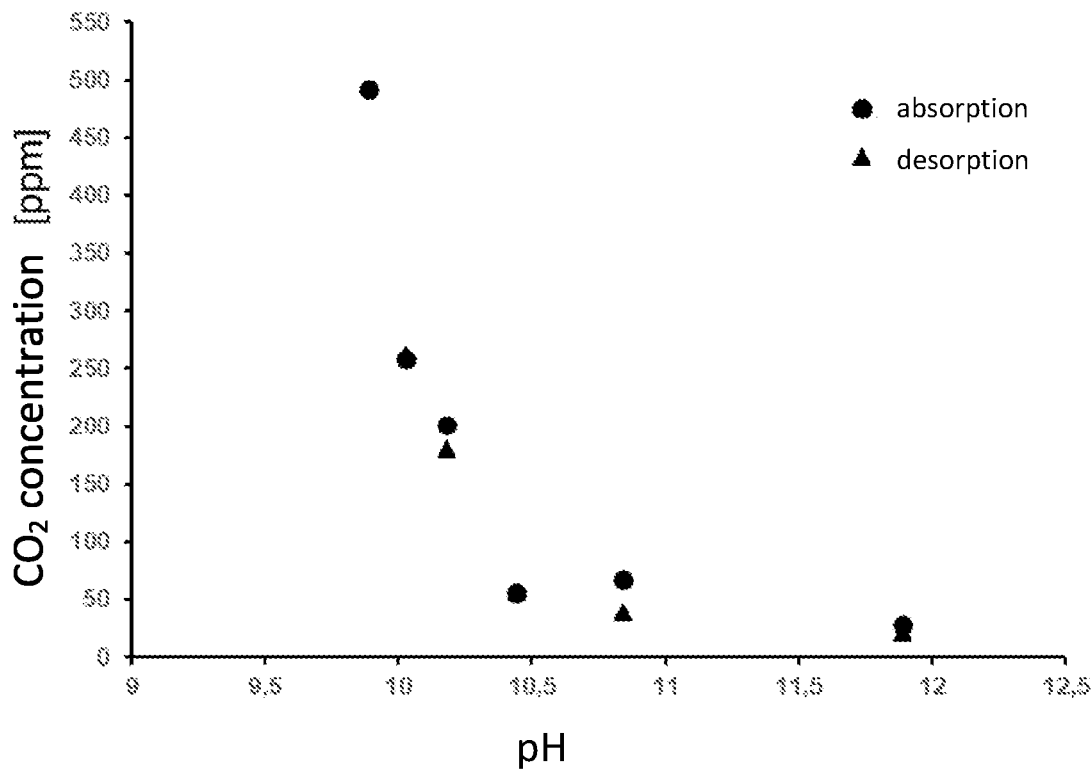
FIG. 3 the determination of the loading limit of a TEG/DGA/water system.

FIG. 3 shows the determination of the loading limit of the DGA/TEG/water composition at different carbon dioxide loadings. To quantitatively assess the $CO_2$ uptake capacity, the measurement method was carried out for different $CO_2$ loadings of the solution. For rapid loading, a 14 vol % $CO_2$ stream was introduced between each measurement. $CO_2$ absorption leads to a decrease in pH, which is proportional to the amount of $CO_2$ absorbed. FIG. 3 shows the $CO_2$ concentration in the gas phase that will be set in contact with the liquid surface as a function of pH for 4.8 wt % DGA in an each 47.6 wt % TEG/$H_2O$ solution. The measurement results prove that in a pH interval of 11.8 to 9.8, corresponding to a loading of 0.2 mol $CO_2$ per mol absorbent, the $CO_2$ uptake below 400 ppm is possible. The achievable loading is sufficient for the application of the polyethylene glycol amines and the substances listed above in a technical process for $CO_2$ absorption.

Figure 4:
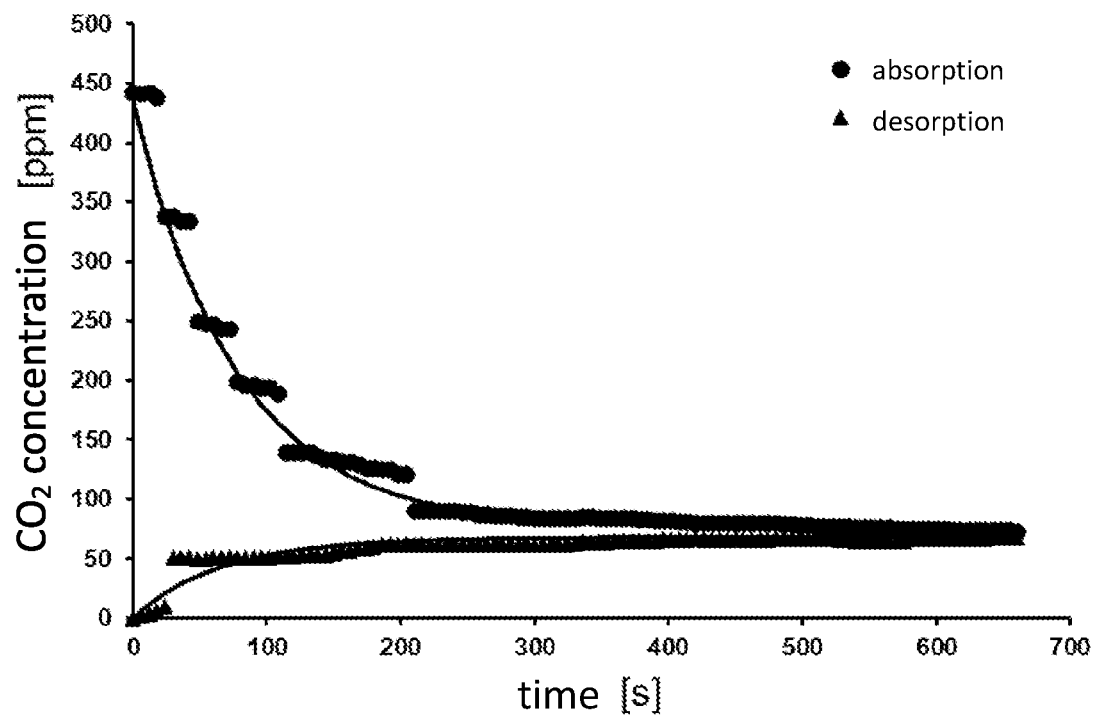
FIG. 4 the carbon dioxide absorption and desorption isotherms of a carbon dioxide absorbent according to the invention with PEI/TEG/water system.

FIG. 4 shows the carbon dioxide absorption and desorption isotherms of a PEI/TEG/water system. Polyethylene imines are completely soluble in water or polyethylene glycol/water mixtures up to a molecular weight of $M_w \sim 10^5$ up to 60 wt %. Both linear and branched polyethylene amines are suitable for $CO_2$ absorption. Starting with a $CO_2$ concentration of 450 ppm in $N_2$, a concentration of about 70 ppm is obtained at equilibrium on a 7 wt % polyethyleneimine solution. This is confirmed by $CO_2$ enrichment in an initially pure nitrogen atmosphere. Experiments with $CO_2$ loaded solution show $CO_2$ absorptions below 400 ppm in a pH interval of 11.9 to 10. This corresponds to a $CO_2$ loading of 0.2 based on the number of nitrogen atoms in the molecule.

Figure 5:
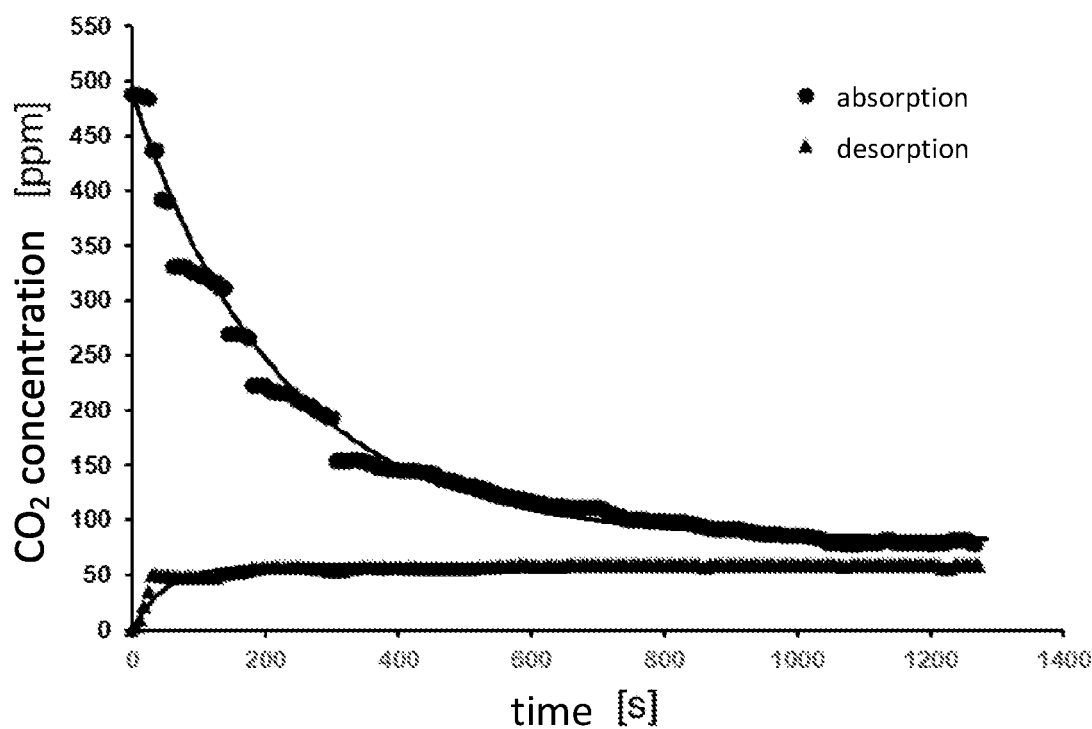
FIG. 5 the carbon dioxide absorption and desorption isotherms of a carbon dioxide absorbent according to the invention with meglumine/PEG200/water system.

FIG. 5 shows the carbon dioxide absorption and desorption isotherms of a meglumine/PEG200/water system with carbon dioxide. In general, sugar derivatives dissolved in a PEG/$H_2O$ solution, such as N-methyl-D-glucamine (meglumine) or N-ethyl-D-glucamine (eglumine), which exhibit negligible partial pressure in solution, are suitable for $CO_2$ absorption. Starting from an initial $CO_2$ concentration of 500 ppm in $N_2$, a concentration of about 79 ppm is obtained on a 45.6 wt % PEG 200 solution containing 8.8 wt % polyethyleneimine within the observation period of about 21 minutes. Experiments with $CO_2$ loaded solution showed $CO_2$ absorptions below 400 ppm in a pH interval of 11.1 to 10.1 for the ternary composition. When PEG is replaced by MEG, $CO_2$ adsorption occurs in a pH interval of 11.3-10.0. This corresponds to a $CO_2$ loading of 0.16 (PEG 200) and 0.18 (MEG) based on the number of nitrogen atoms in the molecule. Depending on the mass fraction used for PEG of 1 to 0, for example, additions of sugar derivatives of 1 wt % to 60 wt % are possible.

Figure 6:
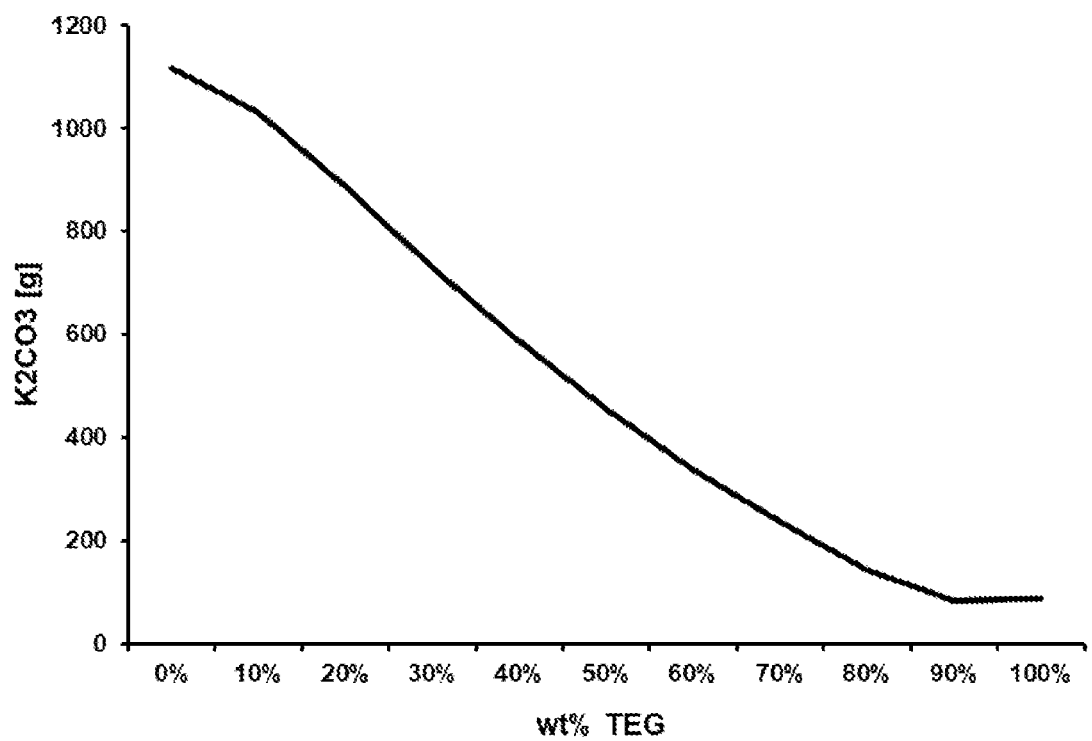
FIG. 6 the influence of the solubility of potassium carbonate as a function of the TEG content.

FIG. 6 shows the influence of the solubility of potassium carbonate as a function of the TEG content. In a carbonate-containing PEG/water solution, $CO_2$ is absorbed by the formation of hydrogen carbonate. In this case, PEG not only serves to adjust the water vapor partial pressure according to the ambient conditions, but also decisively lowers the solubility of the hydrogen carbonate, so that at atmospheric $CO_2$ concentrations below 400 ppm, there is a steady uptake of $CO_2$ and precipitation as hydrogen carbonate or a compound containing hydrogen carbonate. In principle, sodium and potassium carbonates are suitable. When adding the carbonates to a PEG/water mixture, it should be noted that the solubility changes as a function of the binary composition of the solvent. FIG. 6 shows the solubility of $K_2CO_3$ in a triethylene glycol/water solution as a function of the binary composition of the solvent.

Figure 7:
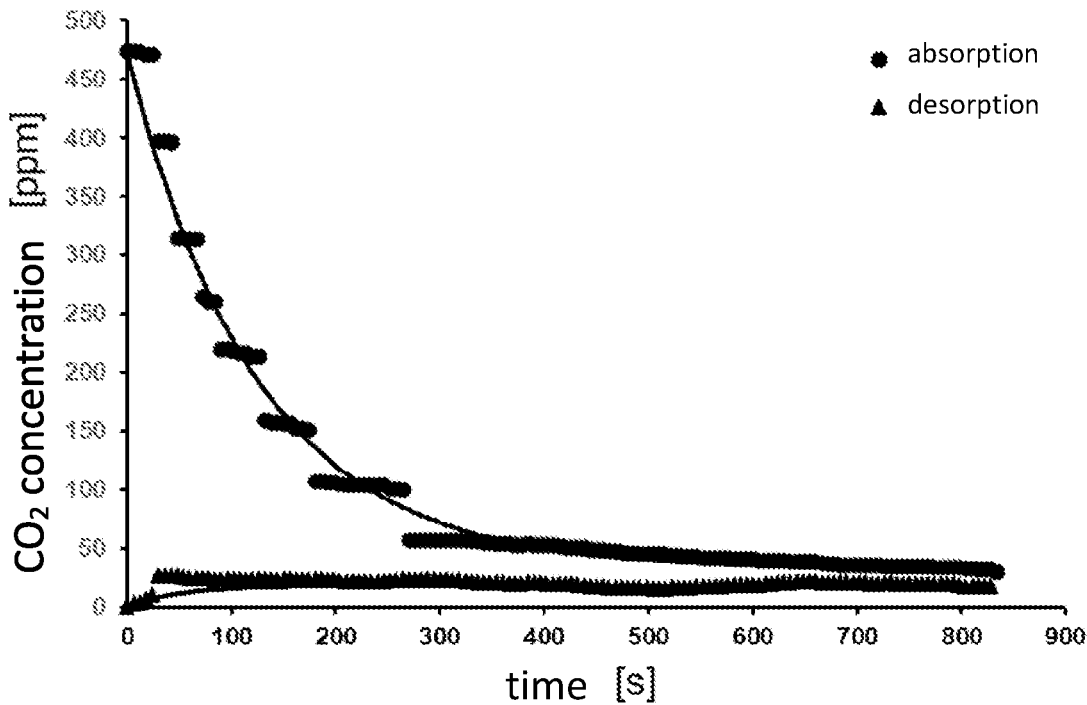
FIG. 7 the carbon dioxide absorption and desorption isotherms of a carbon dioxide absorbent according to the invention with $K_2CO_3$/TEG/water system.

FIG. 7 shows the carbon dioxide absorption and desorption isotherms of a $K_2CO_3$/TEG/water system with carbon dioxide. Using a 38.6 wt % TEG solution with 23.4 wt % $K_2CO_3$, a $CO_2$ concentration decrease to 32 ppm is achieved within a time interval of 828 s. Experiments to determine the achievable loading capacity with the above trinary composition show, starting at a pH of 12.6, from a pH of 11.6 the precipitation of a white precipitate which can be identified essentially as potassium hydrogen carbonate. There is thus a steady uptake of $CO_2$ from the environment and precipitation as hydrogen carbonate. The use of sodium carbonate as $CO_2$ absorbent showed a comparable absorption behavior, but mixtures of sodium carbonate, sodium carbonate hydrate as well as sodium hydrogen carbonate were identified as precipitation products. Thus, to obtain a specific precipitate product for subsequent $CO_2$ release, $K_2CO_3$ is favored as the absorbent. The precipitation of sodium or potassium hydrogen carbonate can also be enhanced by the addition of equionic additives. This is possible in carbonate/water solutions as well as in carbonate/PEG/water solutions.

Figure 8:
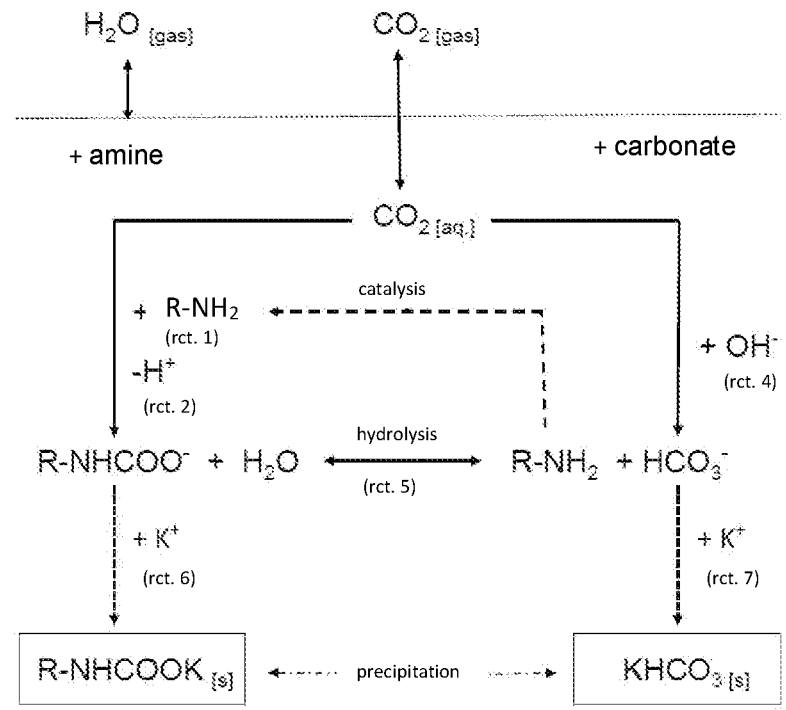
FIG. 8 a simplified reaction scheme for incorporation of carbon dioxide into carbon dioxide absorbents according to the invention.

FIG. 8 shows a simplified reaction scheme for the uptake of carbon dioxide into carbon dioxide absorbents according to the invention, wherein carbonates or amines as component c) are applied. During $CO_2$ absorption into a PEG/$H_2O$/$K_2CO_3$ solution plus an amine-containing additive, carbamate as well as hydrogen carbonate are formed depending on the ternary composition and carbamate stability. The relative ratio is given by the equilibrium constant of reaction equation 5. A potential precipitation results from the solubility products of the carbamate ions or hydrogen carbonate ions with the cations in solution ($Na^+$, $K^+$). The precipitation reduces the $CO_2$ concentration in the solution and thus the corresponding $CO_2$ partial pressure. The addition of amines to a PEG/$H_2O$/$K_2CO_3$ solution leads to an initial substantial increase in the absorption kinetics of $CO_2$, which are dependent on the amine used and proportional to the amine concentration. The dissolved salts of proline and pipecolic acid, as amino acid salts with a heterocycle, for example, show high $CO_2$ mass transfer rates. The transfer rates are similar to those of the heterocyclic amines. The absorption kinetics of the aminohexanoic acid salts correspond approximately to those of the alkanolamines, while the kinetics using aminoisobutyric acid correspond to those of sterically hindered amines. The extent to which the amine used has a catalytic effect depends not only on the speed of the carbamate formation reactions but also on the hydrolysis equilibrium and the associated equilibrium constants. Due to the low carbamate stability, secondary amines and sterically hindered amines, such as amino isobutyric acid and pipecolic acid, are advantageous. The rate of the carbamate formation reaction as well as the hydrolysis equilibrium determine the catalytic activity. Sterically hindered heterocycles are particularly suitable as catalytically active substances due to their fast $CO_2$ absorption kinetics and low carbamate stability. This was demonstrated using pipecolic acid.

Figure 9:
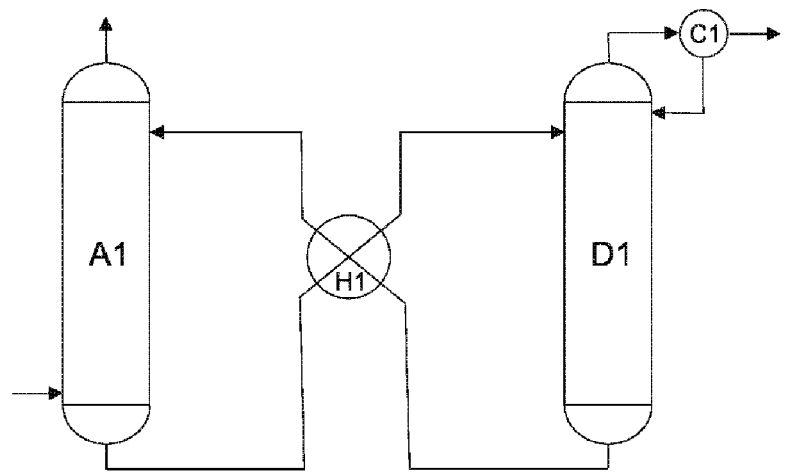
FIG. 9 a method variant of an industrial-scale embodiment for using a carbon dioxide absorbent according to the invention.

FIG. 9 shows a method variant of an industrial-scale design for using a carbon dioxide absorbent according to the invention. In this and the other variants, the air is brought into contact with the absorbent solution. In the simplest case, an open liquid vessel is sufficient. To optimize the $CO_2$ absorption in the technical process, an absorber column can be used. Given the low $CO_2$ concentration in the air and the required flow rates, it is energetically necessary to keep the pressure loss in the air flow as low as possible. Possible technical absorber designs are: packing columns, spray absorbers, bubble column reactors. Packing columns should be designed to handle slurries. Gaining of the $CO_2$ and recycling of the absorbent may be accomplished by various methods. In this design, it is shown that the loaded detergent may be in the form of a liquid or slurry. If appropriately configured, this can be fed directly to a desorber via a heat exchanger and regenerated there by heating, flashing to a lower pressure or stripping. PEG/$H_2O$/amine solutions, for example, are suitable for use in this method. The overall composition may result from adjustment to relative humidity, with mole fraction of water around 0.5. The amine concentration can be between 10 wt % and 60 wt %. PEG/$H_2O$/$K_2CO_3$ solutions are also suitable. The ternary composition $n_{H_2O}$, $n_{PEG}$ and $n_{K_2CO_3}$ results from the adjustment to the relative humidity taking into account the additional water vapor partial pressure reduction due to the amount of carbonate added. To achieve high $CO_2$ uptake and precipitation as hydrogen carbonate, the maximum carbonate concentration is aimed for at the given PEG solubility. Thus, for $K_2CO_3$ concentrations between 10 wt % and 50 wt % and $Na_2CO_3$ concentrations between 2 wt % and 20 wt % are obtained. Amine-containing substances, for example, can be used to accelerate $CO_2$ uptake. The concentration can be adapted to the particular method and can, for example, be between 10% wt % and 30% wt %.

Figure 10:
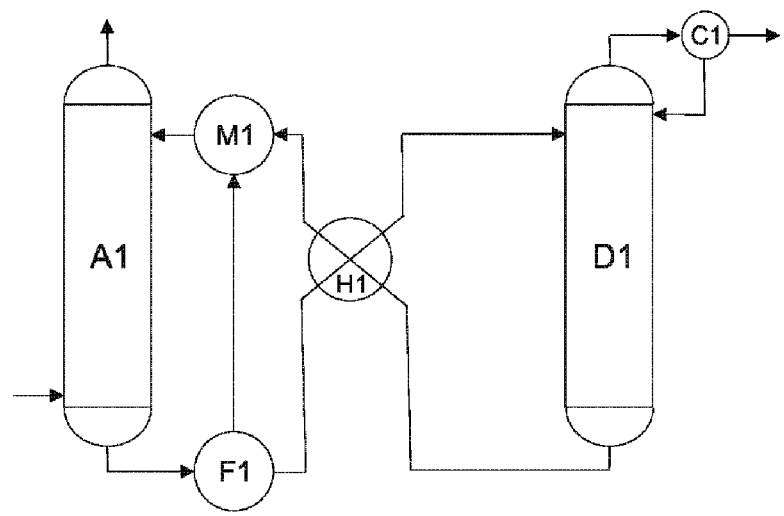
FIG. 10 a further method variant of an industrial-scale embodiment for using a carbon dioxide absorbent according to the invention.

FIG. 10 shows a further method variant of an industrial-scale design for using a carbon dioxide absorbent according to the invention. This is particularly suitable for PEG/$H_2O$/$K_2CO_3$ solutions with a further additive. If the product of the $CO_2$ uptake is present here as a suspended crystalline substance in the solution, then by precipitation, the $CO_2$-containing compound can be enriched in the suspension. The depleted absorber solution is returned to the absorber via the mixer, M1. The partial stream enriched with the precipitation product enters a desorber via a heat exchanger and, after desorption, can be recycled as a carbonate solution or suspension via the heat exchanger M1 and subsequently into the absorber A1. The presented method is in the sequence of the individual process steps: $CO_2$ absorption, precipitation of a $CO_2$-containing compound and desorption.

Figure 11:
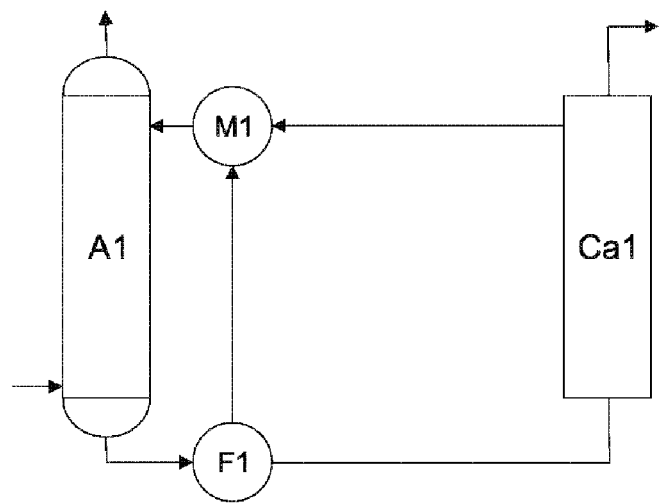
FIG. 11 a further method variant of an industrial-scale embodiment for using a carbon dioxide absorbent according to the invention.

FIG. 11 shows a further method variant of an industrial-scale design for using a carbon dioxide absorbent according to the invention. In this variant, the precipitation product containing $CO_2$ is completely precipitated and dried as sodium or potassium hydrogen carbonate. The main advantage of this method is that calcination takes place at a temperature as low as 160° C. For the most part, the required thermal energy can be provided by subsequent synthesis steps, such as the conversion of the $CO_2$ with $H_2$ to methane. Here, it is favorable that rapid $CO_2$ absorption as well as an equilibrium constant as high as possible for the equilibrium reaction can be achieved. For these cases, for example, primary and secondary amines can be used as sufficiently rapid substances. Low carbamate stability may be due to steric hindrance. In addition, the solubility product for the cations in solution with the hydrogen carbonate ions should be much lower than the solubility product with the carbamate ions. For this purpose, the amine concentration should be as low as possible. For example, the precipitation products can be obtained with a purity of 99±1%.

Figure 12:
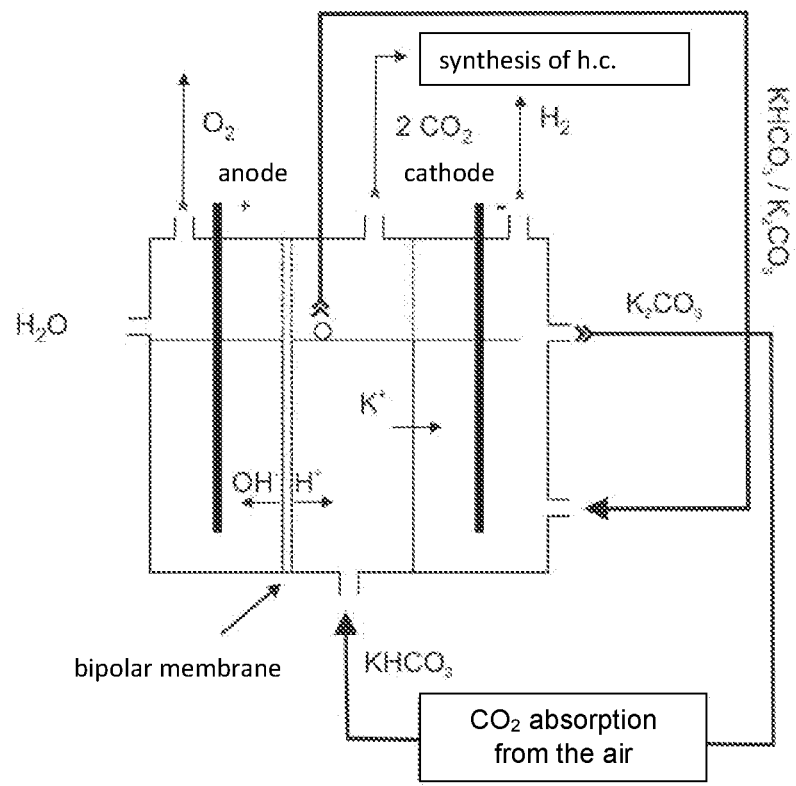
FIG. 12 a partial method step according to the invention in the form of a three-chamber electrolysis of an air stream charged with carbon dioxide.

FIG. 12 shows a partial method step according to the invention in the form of a three-chamber electrolysis of an absorbent loaded with carbon dioxide. A carbonate-based absorbent can be loaded with carbon dioxide, for example, from an air stream, such as ambient air or industrial exhaust air. Due to the uptake at least partial conversion of the carbonate to hydrogen carbonate occurs. The hydrogen carbonate-containing solution is added to the middle chamber of an electrolysis unit comprising at least three chambers. The middle chamber is separated from the anode compartment by a bipolar membrane and from the cathode compartment by means of a membrane permeable to potassium, or alkali ions in general. By applying a voltage, oxygen is evolved in the anode chamber, hydrogen in the cathode chamber and carbon dioxide in the middle chamber. The individual gas streams can be collected separately. The carbon dioxide-depleted solution in the middle chamber now has a higher carbonate and a lower hydrogen carbonate content. This recycled solution can be used again as an absorbent for an air stream containing carbon dioxide. In terms of reaction equations, the following conversions occur at the different reaction sites:

At the anode:

$$2OH^- \rightarrow H_2O + \tfrac{1}{2}O_2 + 2e$$

At the bipolar membrane:

$$2H_2O \rightarrow 2H^+ + 2OH^-$$

In the intermediate cell:

$$2HCO_3^- + 2H^+ \rightarrow 2CO_2 + 2H_2O$$

In sum, the total reaction of the intermediate cell is:

$$2KHCO_3 \rightarrow 2K^+ + 2CO_2 + 2H_2O$$

The following reactions take place at the cathode:

$$4H_2O \rightarrow 2H_3O^+ + 2OH^-$$

$$2H_3O^+ + 2e \rightarrow H_2 + 2H_2O$$

$$2KHCO_3 + 2K^+ + 2OH^- \rightarrow 2K_2CO_3 + 2H_2O$$

Overall, the result for the cathode compartment is thus:

$$2KHCO_3 + 2K^+ + 2e \rightarrow 2K_2CO_3 + H_2$$

The three-chamber structure is extendable as desired with respect to the middle unit. In this respect, 5-, 7-, 9- or generally 3+2n-chamber structures can also be used with the absorbent of the invention or, for example, with pure hydrogen carbonate or amino acid solutions with only slightly modified electrochemical properties.

Figure 13:
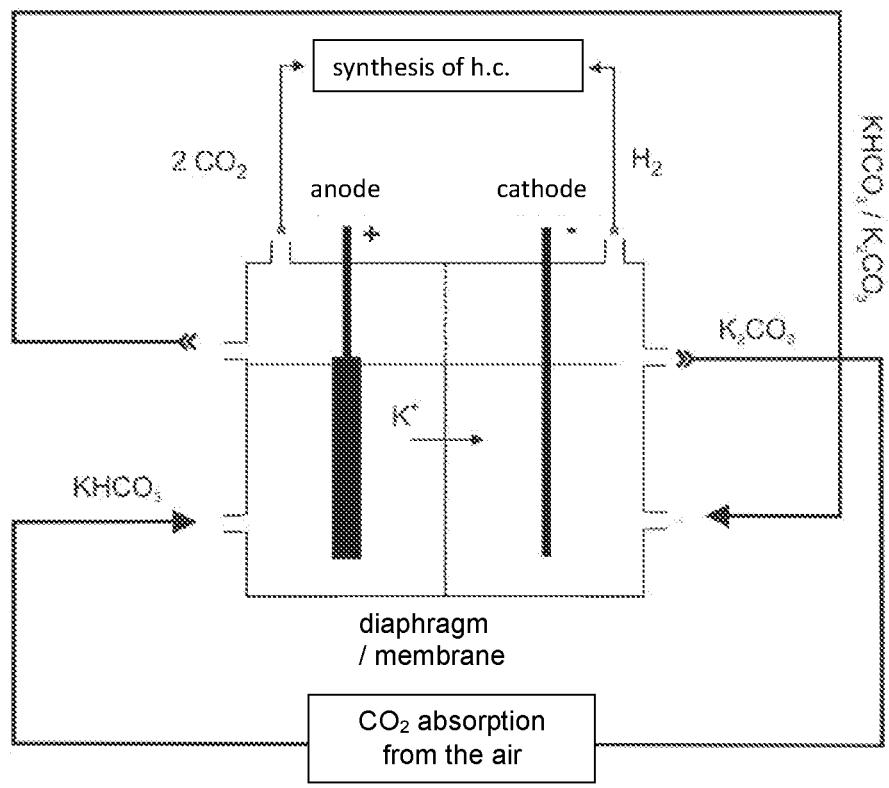
FIG. 13 a partial method step according to the invention in the form of a two-chamber electrolysis of an air stream charged with carbon dioxide with a nickel hydroxide anode.

FIG. 13 shows a partial method step according to the invention in the form of a two-chamber electrolysis of a carbon dioxide-loaded air stream with nickel hydroxide anode. An absorbent with an alkali carbonate component is loaded with carbon dioxide from an air stream. The carbonate is converted, at least partially, to hydrogen carbonate, which is introduced into the anode compartment of a two-chamber electrolysis system. The electrolysis cell has an alkali-permeable membrane separating the anode compartment from the cathode compartment. The anode is a porous anode which is able to bind oxygen. In this respect, only the carbon dioxide formed leaves the anode compartment. Hydrogen is formed in the cathode chamber. In this respect, the different gases occur at different locations and do not have to be separated from each other in a complex manner. The anode can then be thermally regenerated from time to time with the release of oxygen. The following reactions result:

Anode $$2KHCO_3 \rightarrow 2K^+ + 2HCO_3^-$$

$$2HCO_3^- \rightarrow 2CO_2 + 2OH^-$$

$$2\,Ni(OH)_2 + 2OH^- \rightarrow 2NiOOH + 2H_2O + 2e$$

The overall reaction is:

$$(KHCO_3 + Ni(OH)_2 \rightarrow K^+ + CO_2 + NiOOH + e) \times 2$$

The following reactions take place at the cathode:

$$4H_2O \rightarrow 2H_3O^+ + 2OH^-$$

$$4H_3O^+ + 2e \rightarrow H_2 + 2H_2O$$

$$2KHCO_3 + 2K^+ + 2OH^- \rightarrow 2K_2CO_3 + 2H_2O$$

Overall, the total reaction in the cathode compartment is:

$$2KHCO_3 + 2K^+ + 2e \rightarrow 2K_2CO_3 + H_2$$

Figure 14:
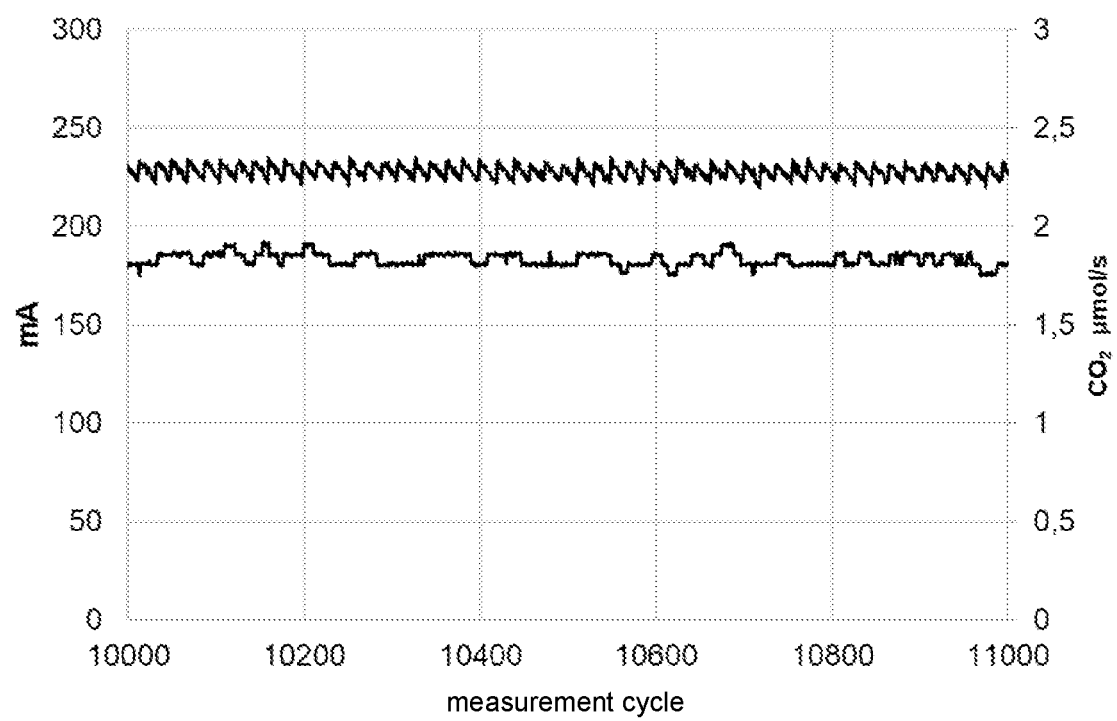
FIG. 14 the current profile and the carbon dioxide evolution of a hydrogen carbonate-based absorbent in a three-chamber electrolysis system.

FIG. 14 shows the current profile and carbon dioxide evolution of a hydrogen carbonate-based absorbent in a three-chamber electrolysis. The absorbent is based on a 10 wt % $KHCO_3$ solution and the figure shows the measured current and the determined $CO_2$ volumetric current as a function of the measurement cycles. Plotted are the data of the measurement cycles from 10000 to 11000, where the time interval of a measurement cycle is 1 second. The measurement was performed at a temperature of 20° C. Electrolyte solutions with the following ingredients were used: anode: KOH 5.4 wt %; intermediate chamber: $KHCO_3$ 10 wt %; cathode: $KHCO_3$ 10 wt %. The fluctuating current flow is due to bubble formation and detachment on the surface of the bipolar membrane. For a similar reason, the $CO_2$ gas flow rate also fluctuates somewhat. The stoichiometric ratio of the released gas amounts was approximately the ratio: 2:1:1/2 for $CO_2$, $H_2$, $O_2$. The Faraday efficiency obtained in the simple experimental setup related to $CO_2$ was about 80%.

Figure 15:
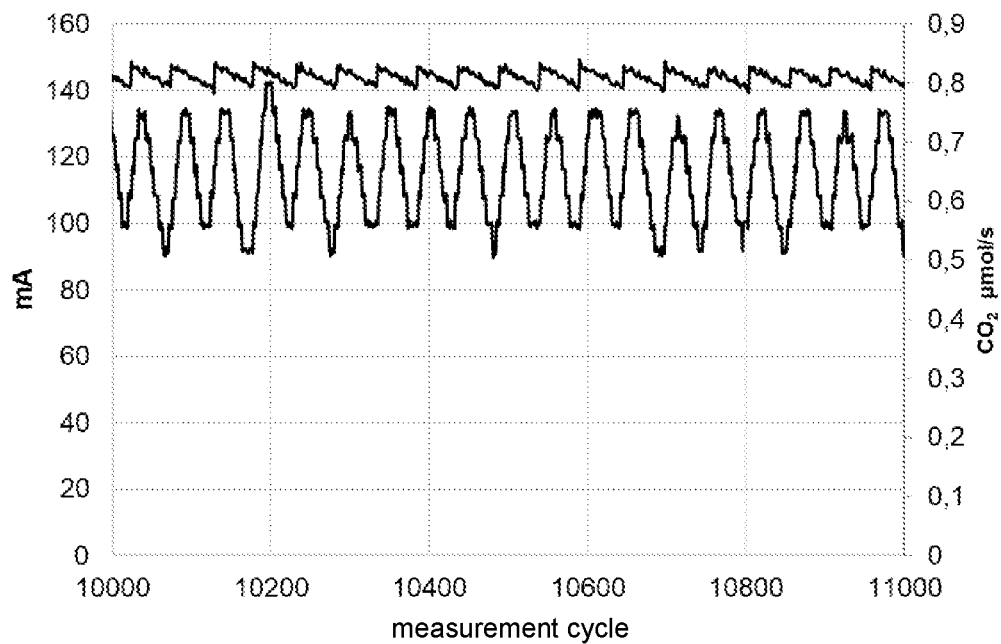
FIG. 15 the current profile and carbon dioxide evolution of an amino acid-based absorbent in a three-chamber electrolysis.

FIG. 15 shows the current profile and the carbon dioxide evolution of an amino acid-based absorbent in a three-chamber electrolyzer. The current applied as well as the $CO_2$ gas flow rate achieved during the electrolysis of an amino acid salt solution loaded with $CO_2$ in the three-chamber electrolyzer are plotted. The measurement was also performed at a temperature of 20° C. Electrolyte solutions of the following composition were used: anode: KOH, 5.4 wt %; intermediate chamber: loaded amino acid salt solution with proline, 10 wt %; cathode: loaded amino acid salt solution proline 10 wt %. $CO_2$ loading was performed before electrolysis in a bubble column reactor by passing a 14 vol % $CO_2$ gas stream. The measured fluctuating current flow is again due to bubble formation and detachment at the surface of the bipolar membrane. The same applies to the fluctuations in the $CO_2$ gas flow rate. The stoichiometric ratio of the released gas quantities was approximately the ratio: 1:1:1/2 for $CO_2$, $H_2$, $O_2$. The Faraday efficiency obtained in this simple experimental setup related to $CO_2$ was about 85%.

Figure 16:
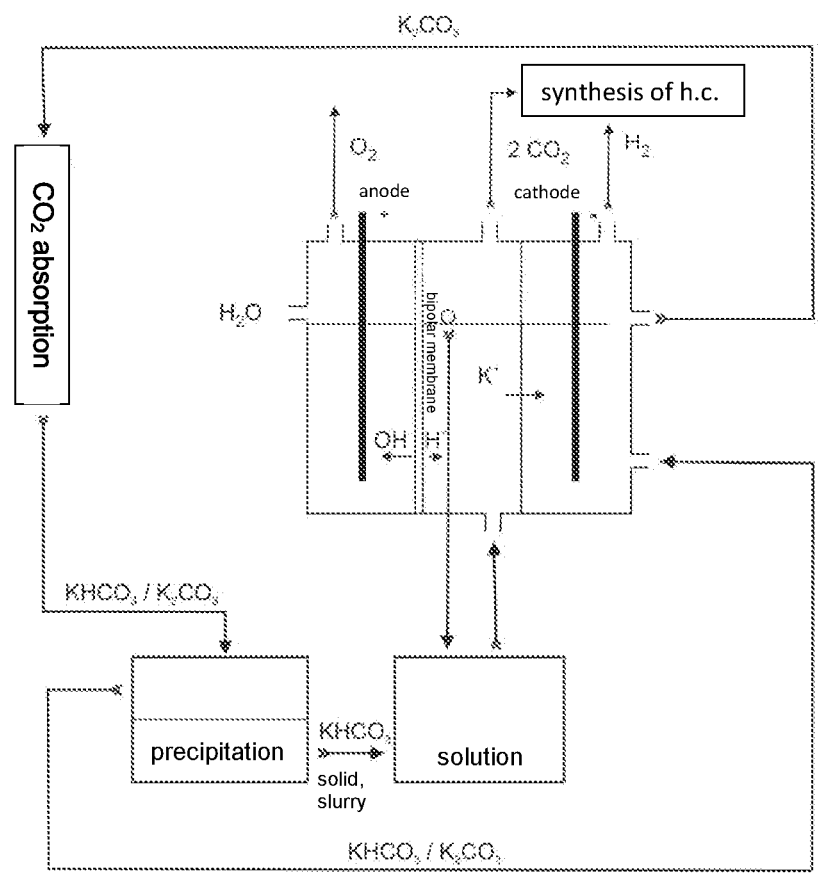
FIG. 16 the combination of three-chamber electrolysis with precipitation of $KHCO_3$ after $CO_2$ absorption.

FIG. 16 shows one possibility for combining three-chamber electrolysis with precipitation of $KHCO_3$ after $CO_2$ absorption. It is therefore also possible that the hydrogen carbonate formed by carbon dioxide uptake does not have to be processed directly in the cycle with electrolysis. For example, the hydrogen carbonate can be stored and then subjected to electrolysis in batches.

The invention claimed is:

1. A method for absorbing carbon dioxide from an air stream, the method comprising:
    loading an absorbent with the carbon dioxide in a first device, wherein a hydrogen carbonate-containing solution is formed;
    feeding the hydrogen carbonate-containing solution from the first device into an electrolysis unit;
    electrolyzing the hydrogen carbonate-containing solution in the electrolysis unit to release carbon dioxide, wherein a carbonate-rich solution is formed in the electrolysis unit;
    forming oxygen, hydrogen and carbon dioxide in the electrolysis unit; and
    recycling the carbonate-rich solution from the electrolysis unit to the first device,
    wherein the absorbent comprises an alkali carbonate component, which is at least partially converted to hydrogen carbonate in the first device,
    wherein the hydrogen carbonate is precipitated after the conversion,
    wherein the precipitated hydrogen carbonate is separated, and
    wherein the precipitated hydrogen carbonate is used to form the hydrogen carbonate-containing solution.

2. The method according to claim 1,
    wherein the electrolysis unit comprises at least a first chamber and a second chamber,
    wherein the hydrogen carbonate-containing solution is fed to at least the first chamber,
    wherein, in the first chamber, the hydrogen carbonate is consumed and at least the carbon dioxide is formed, and
    wherein, in the second chamber, the hydrogen carbonate is converted to carbonate to form the carbonate-rich solution.

3. The method according to claim 1, wherein the carbonate-rich solution has a higher carbonate content and a lower hydrogen carbonate content than the hydrogen carbonate-containing solution.

4. The method according to claim 1, wherein the precipitated hydrogen carbonate has a purity of 99±1%.

5. The method according to claim 1, wherein the absorbent is fed to the electrolysis unit after separation of the hydrogen carbonate.

6. The method according to claim 1,
    wherein the electrolysis unit is a two-chamber electrolysis unit with an anode chamber and a cathode chamber and the hydrogen carbonate-containing solution is fed to the anode chamber, and
    wherein the anode chamber and the cathode chamber are separated by a cation-selective membrane.

7. The method according to claim 1,
    wherein the electrolysis unit comprises at least a three-chamber electrolysis unit with an anode chamber, a cathode chamber, at least one middle bridge chamber, a cation-selective membrane adjacent to the cathode chamber and a bipolar membrane adjacent to the anode chamber, and wherein the hydrogen carbonate-containing solution is fed to at least one of the middle bridge chambers.

8. The method according to claim 1, wherein the air stream comprises a carbon dioxide concentration of greater than or equal to 100 ppm and less than or equal to 650 ppm.

9. A method for absorbing carbon dioxide from an air stream, the method comprising:
    loading an absorbent with the carbon dioxide in a first device, wherein the absorbent comprises an alkali carbonate component, which is at least partially converted to hydrogen carbonate in the first device;
    after converting, precipitating the hydrogen carbonate;
    separating the precipitated hydrogen carbonate;
    forming a hydrogen carbonate-containing solution based on the precipitated hydrogen carbonate;
    feeding the hydrogen carbonate-containing solution from the first device into an electrolysis unit;
    electrolyzing the hydrogen carbonate-containing solution in the electrolysis unit to release carbon dioxide, wherein a carbonate-rich solution is formed in the electrolysis unit;
    forming oxygen, hydrogen and carbon dioxide in the electrolysis unit; and
    recycling the carbonate-rich solution from the electrolysis unit to the first device.

10. The method according to claim 9,
    wherein the electrolysis unit comprises at least a first chamber and a second chamber,
    wherein the hydrogen carbonate-containing solution is fed to at least the first chamber,
    wherein, in the first chamber, the hydrogen carbonate is consumed and at least the carbon dioxide is formed, and
    wherein, in the second chamber, the hydrogen carbonate is converted to carbonate to form the carbonate-rich solution.

11. The method according to claim 9, wherein the carbonate-rich solution has a higher carbonate content and a lower hydrogen carbonate content than the hydrogen carbonate-containing solution.

12. The method according to claim 9, wherein the precipitated hydrogen carbonate has a purity of 99±1%.

13. The method according to claim 9, wherein the absorbent is fed to the electrolysis unit after separation of the hydrogen carbonate.

14. The method according to claim 9, wherein the air stream comprises a carbon dioxide concentration of greater than or equal to 100 ppm and less than or equal to 650 ppm.

* * * * *